United States Patent
Baron

(10) Patent No.: US 8,293,185 B2
(45) Date of Patent: Oct. 23, 2012

(54) UV IRRADIATION APPARATUS AND METHOD

(75) Inventor: John Michael Baron, Macclesfield (GB)

(73) Assignee: Statiflo International Limited, Cheshire (GB)

( * ) Notice: Subject to any disclaimer, the term of this patent is extended or adjusted under 35 U.S.C. 154(b) by 0 days.

(21) Appl. No.: 13/129,071

(22) PCT Filed: Nov. 10, 2009

(86) PCT No.: PCT/GB2009/002643
§ 371 (c)(1), (2), (4) Date: May 12, 2011

(87) PCT Pub. No.: WO2010/055288
PCT Pub. Date: May 20, 2010

(65) Prior Publication Data
US 2011/0215055 A1    Sep. 8, 2011

(30) Foreign Application Priority Data
Nov. 12, 2008 (GB) .................................. 0820644.3

(51) Int. Cl.
*C02F 1/32* (2006.01)
(52) U.S. Cl. ............ 422/186.3; 422/21; 422/22; 422/24; 422/186; 210/748.01; 210/748.07; 210/748.1; 250/432 R; 250/436; 250/437; 250/438; 366/336; 366/337; 366/338
(58) Field of Classification Search ............. 210/748.01, 210/748.1, 748.11, 748.06, 748.07, 748.08, 210/748.09, 748.13, 748.17, 758, 764, 765, 210/167.01, 252, 348, 354, 357; 250/438, 250/432 R, 433, 436, 437, 504, 455.11; 204/157.42; 422/186.3, 24, 21, 22, 28, 135, 186, 183.3; 366/336, 337, 338, 339, 340
See application file for complete search history.

(56) References Cited

U.S. PATENT DOCUMENTS
4,123,178 A * 10/1978 Salzman et al. .............. 366/338
(Continued)

FOREIGN PATENT DOCUMENTS
CA     2249966 A1     4/2000
(Continued)

OTHER PUBLICATIONS
PCT/GB2009/002643—International Search Report.
GB Search Report for GB0820644.3, dated Feb. 18, 2009, 2 pages.

*Primary Examiner* — Joseph Drodge
*Assistant Examiner* — Cameron J Allen
(74) *Attorney, Agent, or Firm* — Bracewell & Giuliani LLP

(57) ABSTRACT

A method and an apparatus are described for use in the irradiation of fluids. The apparatus has an elongate conduit (312) having a central axis (334) and two or more elongate ultraviolet radiation sources (114) extending along the interior of the conduit for irradiation of the fluid within the conduit. An array of static mixer elements (300) is located within the conduit, and the two or more elongate ultraviolet radiation sources (114) are arranged to extend through apertures in deflection surfaces of the static mixer elements making up the array (300). The apparatus and method allows for reliable and uniform ultraviolet irradiation of fluids of low UV transmissivity, such as turbid fluids, particularly for ultraviolet disinfection of such fluids. Wipers may be fitted to the static mixer elements to enable relative movement between the static mixer elements and the surfaces of the elongate ultraviolet radiation sources to clean the surfaces of the sources without need to dismantle the apparatus.

11 Claims, 4 Drawing Sheets

| U.S. PATENT DOCUMENTS | | | | |
|---|---|---|---|---|
| 4,367,410 A * | 1/1983 | Wood | | 250/431 |
| 5,675,153 A * | 10/1997 | Snowball | | 250/438 |
| 7,169,311 B2 * | 1/2007 | Saccomanno | | 210/198.1 |
| 2002/0162968 A1 | 11/2002 | Snowball | | |
| 2003/0146082 A1 * | 8/2003 | Gibson et al. | | 204/157.3 |
| 2003/0205454 A1 * | 11/2003 | Hlavinka et al. | | 204/157.15 |
| 2006/0110298 A1 * | 5/2006 | Neitemeier | | 422/186.3 |

| FOREIGN PATENT DOCUMENTS | | |
|---|---|---|
| EP | 0 071 454 A1 | 2/1983 |
| EP | 0 811 578 A2 | 12/1997 |
| GB | 2 389 577 A | 12/2003 |
| WO | 92/20974 | 11/1992 |
| WO | 03/095369 A1 | 11/2003 |
| WO | 03092746 A1 | 11/2003 |

* cited by examiner

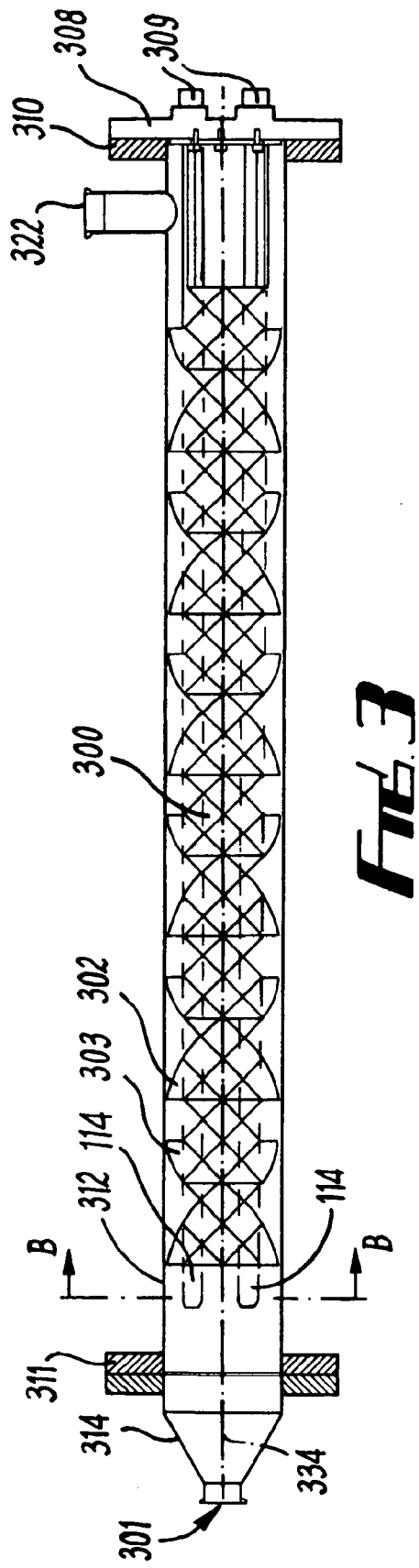
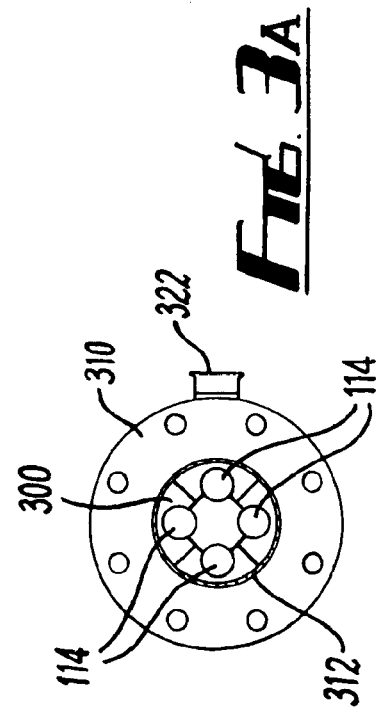
Fig. 3
Fig. 3A

UV IRRADIATION APPARATUS AND METHOD

RELATED APPLICATION

This application claims priority to PCT application PCT/GB2009/002643 filed Nov. 10, 2009, which claimed priority to British patent applications GB U0820644.3 filed Nov. 12, 2008.

The present invention relates to a method and an apparatus for irradiation of a fluid with ultraviolet radiation. In particular the method and apparatus is suitable for use with fluids of low UV transmissivity, especially turbid liquids or dispersions.

It is known that harmful bacteria in fluids such as water are killed if exposed to electromagnetic radiation of a known "germicidal wavelength", e.g. ultraviolet (UV) radiation of wavelength between 180 nm to 280 nm may be used.

This effect is utilised to purify (or "disinfect") low viscosity liquids such as water and wastewater. The complete absence of any need for chemical additives to achieve disinfection is an advantage over more traditional methods. Ultraviolet disinfection is now utilised in many modern water and wastewater or sewage treatment plants.

The use of radiation, such as ultraviolet radiation, in chemical reactors is also known for the purpose of initiating chemical reactions within the reactor.

FIG. 1 illustrates a typical design of a prior art irradiation apparatus 10, for irradiating a fluid with radiation, specifically ultraviolet radiation, commonly referred to as a UV reactor. The apparatus includes a U-shaped pipe 12. Several UV lamps 14 extend along the base section of the pipe 12. The lamps 14 are powered by an electrical power supply 16, located outside of the pipe 12. The lamps 14 extend through an end wall 18 of the pipe 12, for connection to the power supply 16.

Fluid, such as water, enters the pipe 12 via inlet aperture 20, flows through the pipe 12, and exits the pipe 12 through outlet aperture 22. Fluid passing adjacent the UV lamps 14 is irradiated, and hence disinfected. To facilitate cleaning of the lamps 14, a series of baffle plates 24 each extend in a plane, perpendicular to the longitudinal axis of the base of the pipe 12. The plates 24 are capable of longitudinal movement along the lamps 14, for cleaning of the surfaces of the lamps 14. A wiper drive 26 is located outside of the pipe 12, and coupled to each plate 24, for moving the plates. The plates define a series of apertures, for allowing fluid flow along the pipe.

Such known reactors are prone to a number of problems. The residence time of fluid within the reactor can vary widely. This can result in some volumes of fluid being within the reactor for too short a period to be adequately disinfected. The 90° bends within the reactor may result in stagnant zones. Further, fluid flowing adjacent to the lamps 14 within the reactor will receive a higher dose of radiation than fluid distant from the lamps 14. Again, this can lead to unequal treatment of the fluid, resulting in some of the fluid not being disinfected or the reactor being operated in an inefficient manner with a low throughput volume. Inefficient design increases the reactor cost and operating cost.

Moreover, if the fluid is a turbid fluid, such that electromagnetic radiation such as ultraviolet radiation has a short path length through the fluid before extinction, then there is a risk that fluid can pass through the reactor without having come into contact with the radiation at an effective level for disinfection to take place.

EP-A-0202820, describes a UV water purifier including a single UV lamp disposed within an annular duct. The duct has an outer wall defining one or more internally facing ridges, which restrict the flow of water in the axial direction of the duct. The ridges define an inner surface of the duct. The ridges are provided to cause the water passing through the purifier to be repeatedly brought closely adjacent to the UV lamp. However, this apparatus is only suitable for use with one UV lamp. Further, it requires the UV lamp to be in close proximity to the ridges to obtain the desired mixing action, thus restricting flow through the purifier or increasing the pressure drop across the reactor at high flow rates. The mixing arrangement is only suitable for operation at sufficiently high Reynolds numbers, where turbulence will be generated to lead to replacement of fluid at the surfaces of the radiation source.

European Patent application EP 0 071 454 A1 discloses a static mixer comprising a conduit for transporting flowable material and a plurality of stationary mixer elements which so deflect the flow of material such that a thorough mixing is effected. The leading edge of each succeeding mixer element is angled relative to the trailing edge of the immediately preceding mixer element to obtain successive division, mixing and recombination of flows, Japanese Publication JP 10000228 (Yamaura K K and Fujii Sadami) discloses a reactor consisting of a cylinder made of UV transmissible material including an array of static mixer elements. A UV source external to the cylinder is used to irradiate powder or particles flowing through the cylinder. The apparatus relies on the mixer bringing all fluid elements into proximity with the external radiation source at the wall of the cylinder adjacent the source.

US Patent application 2003/0205454 A1 discloses apparatus for reducing pathogens in a fluid, the apparatus including a passage containing static mixer elements arranged for thoroughly mixing the fluid in use of the device and so bringing substantially all the fluid into an irradiation zone in direct proximity to passage walls transparent to radiation. In one embodiment, the static mixer elements are centrally mounted on a hollow core with transparent walls in which one or more radiation sources are located.

It is an aim of the present invention, amongst others, to substantially address one or more of the problems of the prior art, whether referred to herein or otherwise. It is an aim of particular embodiments of the present invention to provide an improved ultraviolet irradiation apparatus, for providing fluid flow through the apparatus that improves the efficiency of the irradiation of the fluid by ultraviolet. In other words, it is one object of the invention is to ensure that substantially all fluid passing through the apparatus has experienced sufficient residence time sufficiently close to the radiation source. Another aim of the invention is to enable irradiation to be used effectively and efficiently on fluids of low UV transmissivity. It is another object of the invention to provide an apparatus that can be used effectively and efficiently to disinfect fluids of low UV transmissivity.

According to a first aspect of the present invention there is provided an ultraviolet irradiation apparatus comprising: a conduit having a central axis and adapted to conduct a fluid through its interior along its length from an inlet port to an outlet port downstream of the inlet port, and two or more elongate ultraviolet radiation sources extending along the interior of the conduit for irradiation of said fluid within the conduit, wherein the apparatus further comprises an array of static mixer elements located within the conduit, each static mixer element comprising one or more deflection surfaces adapted to split and rotate said fluid's flow, and wherein the two or more elongate ultraviolet radiation sources are arranged to extend through apertures in deflection surfaces of the static mixer elements.

The two or more elongate ultraviolet radiation sources are suitably mutually spaced, and arranged so that fluid may pass through a region located between each pair of the two or more ultraviolet radiation sources.

The two or more elongate ultraviolet sources will thus extend through two or more different sets of apertures passing through the static mixer elements, with each set of apertures comprising a plurality of apertures arranged to accept one of the ultraviolet radiation sources. Preferably, the elongate ultraviolet sources will have respective long axes which lie substantially parallel to, but spaced from the central axis of the conduit. In the case of a cylindrical conduit, the long axes of the elongate ultraviolet sources may be located, for instance, between the central axis and the inner wall of the conduit, for instance substantially equidistant between the two.

After the fluid's flow has been split and rotated by deflection surfaces, the split flows from different surfaces are combined then split, rotated and combined again as they pass over further deflection surfaces in the array of static mixer elements, providing improvement in degree of mixing and surface renewal as the fluid passes through the apparatus. Surprisingly, the apparatus of the invention gives improved disinfection of fluids, particularly fluids of low transmissivity, even though the presence of the static mixing elements does not necessarily lead to particularly large improvements in the plug flow behaviour of the fluid or in the residence time distribution for the fluid. Rather, and without wishing to be bound by theory, it is thought that the location of the elongate ultraviolet sources, having their axes off-centre compared to the central axis of the conduit, results in the fluid being forced to flow past the surfaces of the elongate ultraviolet sources in a manner which results in improved renewal of fluid at these surfaces. For instance, it may be that the fluid coating the surfaces of the elongate ultraviolet sources as a boundary layer, and consequently preventing other parts of the fluid from passing close to the ultraviolet source, is more easily removed and replaced by fresh fluid because of the off-axis locations of the elongate ultra-violet sources.

The presence of at least two ultraviolet radiation sources also allows the apparatus to continue functioning effectively after one of the sources breaks down, allowing a changeover to be made at a convenient time rather than immediately upon break-down of a source. The use of a plurality of separate sources also means that all of the fluid can be irradiated with as short a conduit as possible. Furthermore, the presence of the static mixer array means that the fluid passing through the apparatus may still be effectively irradiated by remaining UV sources should one of the sources cease operating.

It will be appreciated that the apparatus may be used to irradiate any suitable fluid. The term fluid encompasses any materials that are capable of flow, including gases, fluidised powders, liquids, pastes, dispersions, emulsions, liquid crystals and the like. The apparatus of the invention is particularly suitable for use in irradiating liquids of relatively low viscosity, for instance liquids having a viscosity of 100 mPa·s or less at a shear rate of 21 sec$^{-1}$. However, more viscous fluids may also be used with the apparatus.

Typically the elongate ultraviolet radiation sources will be in the form of substantially cylindrical tubes. In order to facilitate replacement of burnt-out or broken ultraviolet radiation sources, these may be housed inside separate fluid-tight housings within the apparatus. For instance quartz housings, which are transparent to UV radiation, are suitable. The ultraviolet radiation sources may be in the form of clusters of parallel ultraviolet tubes housed in an assembly, such as a quartz housing, with mirrors arranged to direct the UV radiation outwards. Although an elongate ultraviolet source may comprise a number of individual ultraviolet generators within it, the apparatus of the invention must have at least two, separate elongate ultraviolet sources, arranged to allow fluid to pass between them. For instance, US Patent application 2003/0205454 A1 discloses a hollow core with transparent walls in which one or more radiation sources are located. Although the apparatus disclosed has a plurality of radiation generators, these are clustered into the hollow core to yield a single, central, elongate ultraviolet radiation source.

The static mixer element array of the apparatus of the invention promotes the mixing of fluid within the conduit, particularly radial mixing, without excessive axial mixing. This encourages plug flow and so assists to make more uniform the residence time distribution for the fluid elements flowing through the apparatus. If the fluid passing through the conduit is considered as a plurality of infinitesimal volume elements of fluid, the apparatus ensures that each volume element of fluid has a similar residence time within the apparatus to each other volume element, and also ensures that all volume elements spend sufficient time within an effective distance from a surface of a source of ultraviolet radiation such that the desired effect of the ultraviolet radiation on the on the volume element is achieved. Without wishing to be bound by theory, it is thought that the apparatus is particularly effective at renewing the fluid in regions adjacent to the surfaces of the elongate ultraviolet radiation sources.

The deflection surfaces of the static mixer elements are shaped so as to impart a rotational spin to the incident fluid. As explained above, preferably, the direction of rotational spin changes with each succeeding element. This promotes the movement of fluids from the conduit centre to the conduit wall and back again: a mechanism called radial mixing. Thus, the flow of fluid through the irradiating portion of the conduit is well-mixed, promoting a narrow distribution of fluid element residence times and ensuring excellent renewal of fluid at surfaces within the conduit and at the elongate ultraviolet radiation sources.

Stagnant areas, particularly adjacent to the external surfaces of the elongate radiation sources, and different local fluid velocities based upon radial position with the conduit, are reduced by the static mixer elements, preventing both under- and over-exposure of the fluid to radiation.

Further, as each static mixer element is disposed within the conduit (as opposed to being defined by an internal surface of the conduit), the static mixer array or elongate ultraviolet radiation sources can be easily cleaned e.g. by removal of the static mixer element array and/or radiation sources by sliding them out from the conduit. Further, the static mixer element array may be retrofitted to existing designs of reactor. Static mixer elements are known in the art of mixing two or more fluids, as are arrays of alternating static mixer elements.

Suitably, the array of static mixer elements comprises at least one first static mixer element and at least one second static mixer element alternately positioned along the length of the conduit. By this it is meant that the array of static mixer elements comprises at least two different types of static mixer elements, arranged alternately along the length of the conduit.

Such an arrangement of static mixer elements can be seen for instance in the publications: JP 10000228, U.S. Pat. Nos. 4,408,893, 4,850,705 and 3,704,006.

Each static mixer element can have any suitable value for its element pitch ratio, defined as the number obtained by dividing the length of the element (measured along the direction of flow) by the width of the element perpendicular to the flow direction. Typically, for cylindrical systems, this will be the outside diameter of the static mixer element. Preferably, for the apparatus of the first aspect of the invention, the element pitch ratio for the static mixer elements of the array is from 0.75 to 1.5.

In order to ensure efficient use of the radiation, the static mixer elements may suitably be formed of a material that is substantially transparent to the radiation generated by the radiation sources. For instance, the static mixer elements may be of a material substantially transparent to ultraviolet, or at least to ultraviolet radiation having a wavelength within in the range of wavelengths with which it is desirable to irradiate the fluid. However, for ease of manufacture, the static mixer elements may be formed of metal, such as stainless steel. The apparatus of the invention provides adequate mixing such that transparency of the static mixer elements is not necessary in order to achieve even irradiation of fluid passing through the apparatus.

Typically, the static mixer elements of the array will be fastened to each other by some suitable means to form a rigid array. For instance, the elements may be welded together. Usually, the array will not be permanently fastened to the inner wall of the conduit so that the array can be removed in its entirety, when necessary, for instance for cleaning.

Suitably, at least one of the first and second static mixer elements substantially extends across the conduit's cross section, whereby undeviated flow of said fluid substantially parallel to the central axis is prevented. This helps to ensure that substantially no fluid can pass through the conduit without having its flow split, rotated and recombined by the array of static mixer elements. Preferably, each second static mixer element is positioned to split and rotate said fluid flow from an adjacent upstream first static mixer element.

Each first static mixer element suitably comprises a first deflection surface having a first upstream edge and the first deflection surface is adapted to rotate said fluid's flow through a first angle.

Preferably, each second static mixer element comprises a second deflection surface substantially downstream of a corresponding first deflection surface of an adjacent upstream first mixing element, the second deflection surface having a second upstream edge and being adapted to rotate said fluid's flow through a second angle in an opposite-handed direction to the first angle of the corresponding first deflection surface of the adjacent upstream first static mixer element. This ensures that the fluid's flow, after passing a static mixer element, is further split and divided into at least two flows by the next downstream mixer element.

Suitably, the first angle and the second angle are substantially 180°. Preferably, the first upstream edge (of the first deflection surface of the first static mixer element) is substantially at 90° to the second upstream edge (of the second deflection surface of the second static mixer element).

Preferably, each first static mixer element comprises four first deflection surfaces substantially symmetrically arranged around the central axis of the conduit. The four first deflection surfaces do not have to be identical to each other: they may have different configurations but are combined together in order to form the first static mixing element.

For instance, in a preferred configuration, two of the first deflection surfaces on opposite sides of the central axis rotate said fluid's flow in a left-hand direction and the other two rotate said fluid's flow in a right-hand direction.

Similarly, each second static mixer element preferably comprises four second deflection surfaces substantially symmetrically arranged around the central axis of the conduit; each arranged to be substantially downstream of a corresponding first deflection surface of the adjacent upstream first static mixer element.

Typically, the first and second deflection surfaces are substantially helical or pseudo-helical in shape. By pseudo-helical it is meant that the deflection surfaces have essentially the same twist as a helical surface, but are composed of sections of surface that are not necessarily exactly helical in their geometric shape. For instance, the deflection surfaces may comprise a series of planar surfaces joined together at suitable angles to give a discontinuous shape similar to a helix but with distinct angles between flat sections.

Suitable static mixer elements in the form of an array of alternating first and second static mixer elements, each having four deflection surfaces symmetrically arranged around a central axis, are STM mixer elements, as available from Statiflo International Ltd, Wood Street, Macclesfield, Cheshire, SK11 6JQ, UK.

One problem which may arise is that fluid remnants may deposit on internal surfaces of the apparatus. The apparatus is suitably configured to be readily dismantled for cleaning, whereby the array of static mixer elements and the elongate radiation sources may be, for instance, withdrawn from the conduit for cleaning. However, such a cleaning method requires down-time for the apparatus, during which it cannot be used for irradiation of fluid.

To minimise such down-time, preferably, the array of static mixer elements and the elongate ultraviolet radiation sources may be arranged for relative motion therebetween, whereby the relative motion wipes the surfaces of the elongate ultraviolet radiation sources. Suitably, this may allow deposits to be removed from the surfaces by the wiping.

Suitably, the array of static mixer elements comprises wipers arranged to wipe the surfaces of the elongate ultraviolet radiation sources. The wipers may be formed of a flexible resilient material, such as a rubber or silicone rubber, adapted to conform to the surface of the elongate ultraviolet radiation sources.

Suitably, wipers may be positioned between each pair of static mixer elements of the array of static mixer elements. Wipers may also be positioned at each end of the array of static mixer elements. This means that the entire length of the elongate ultraviolet radiation sources may be wiped clean by moving the elongate ultraviolet radiation sources and the static mixer array relative to each other through the length of a single static mixer element.

Suitably, the apparatus further comprises an actuator coupled to at least one of the array of static mixer elements and to at least one of the elongate ultraviolet radiation sources, for providing the relative motion therebetween.

This means that the surfaces of at least the elongate ultraviolet radiation sources may be wiped to remove deposits whilst the apparatus is still functioning to irradiate a fluid passing through it.

When the apparatus is used disinfection or sterilisation of foodstuff liquids, wiping is preferably not carried out whilst the foodstuff is being collected, in order to prevent contamination by deposits wiped from surfaces.

The apparatus may have any suitable configuration of the conduit and its inlet and outlet ports. For example, the configuration may be U-shaped (i.e. with the inlet and outlet ports having axes substantially normal to the long axis of the conduit, and both located on the same side of the conduit substantially mutually parallel to each other), or may have a Z configuration (i.e. with the inlet and outlet ports having axes substantially normal to the long axis of the conduit, and both located on the opposed sides of the conduit substantially mutually parallel to each other) or an L-shaped configuration (inlet port substantially parallel to the long axis of the conduit and outlet port substantially normal thereto). A preferred configuration for the apparatus is one wherein the inlet port is substantially coaxial with the central axis of the conduit. In other words, the inlet conduit is arranged to provide fluid flowing substantially parallel to the central axis on entry into the conduit. This has been found to give particularly efficient mixing of the fluid in the apparatus and effective surface renewal for the fluid at the surfaces of the elongate ultraviolet radiation sources.

The conduit may be of any suitable cross section, such as square, rectangular or ellipsoidal, but is preferably in the form of a uniform pipe to facilitate withdrawal of the static mixer array and elongate radiation sources. Preferably, the conduit is a cylindrical pipe, with a circular cross-section, such that deposits of fluid are minimised and cleaning is facilitated.

In a particularly preferred configuration, the apparatus comprises elongate ultraviolet radiation sources which are mutually spaced from each other and from the conduit's inner wall and which are substantially symmetrically arranged around the central axis of the conduit. An apparatus with four such sources is preferred. It has been found that this configuration is particularly effective for providing adequate irradiation of fluid with a minimal conduit length. Where the static mixer elements each have four deflection surfaces symmetrically arranged around the central axis, each elongate radiation source suitably extends through substantially the centre of each deflection surface.

By an ultraviolet radiation source is meant a source of electromagnetic ionizing radiation having a wavelength from 100 to 400 nm. A suitable UV source is a mercury vapour lamp.

A second aspect of the invention provides a method of irradiating a fluid with ultraviolet radiation comprising the step of flowing the fluid through an apparatus according to the first aspect of the invention, whilst irradiating the fluid within the conduit with radiation from the elongate ultraviolet radiation sources.

A third aspect of the invention provides a method of irradiating a fluid with ultraviolet radiation comprising the step of flowing the fluid through an apparatus according to the first aspect of the invention having the array of static mixer elements and the elongate ultraviolet radiation sources arranged for relative motion therebetween, and wherein the relative motion wipes the surfaces of the elongate ultraviolet radiation sources whilst irradiating the fluid within the conduit with radiation from the elongate ultraviolet radiation sources.

All preferred features of the first aspect of the invention are applicable to the methods of the second and third aspects of the invention.

The fluid may be irradiated in order to cause chemical reactions to take place. For instance two or more fluids may be mixed in the apparatus and caused to react together as a result of the irradiation. Suitably, catalyst surfaces may also be present within the reactor to promote such reactions.

Suitably, the radiation used in the method is ultraviolet radiation. The method is particularly useful when applied to the purpose of disinfecting the fluid by means of irradiation with ultraviolet radiation. This is because it has been found that effective amounts of ultraviolet radiation to provide total disinfection can be achieved throughout the entire fluid flowing through the apparatus with relatively short conduits.

The transmissivity of UV through the fluid may be measured directly. Transmissivity may be defined as the fraction of incident light power at a specified ultraviolet wavelength (254 nm) that passes through a 1 cm thick sample of the fluid.

The apparatus of the invention is particularly effective with fluids having a transmissivity of 90% or less. Surprisingly, the apparatus of the invention is effective even with fluids having transmissivities of 50% or less. The method is particularly useful when the fluid is a liquid, and because of the nature of the static mixing array, may be effective even when the liquid has a relatively high viscosity. For instance, the method may be used to give effective irradiation by ultraviolet radiation even when the fluid has a viscosity up to $100\,\text{mPa}\cdot\text{s}$ at $21\,\text{sec}^{-1}$ at the operation temperature of the method.

Additional disinfection agents may be added into the fluid flowing through the apparatus in order to assist with disinfection. For instance, ozone or peroxide sources may be added to the fluid flowing through the apparatus. The method and apparatus of the invention are particularly suited to such processes as array of static mixer elements will also ensure good mixing of the added components with the fluid in addition to ensuring that sufficient volume elements of the fluid experience the necessary irradiation.

The length of the conduit, the intensity of radiation and the number of static mixer elements needed to achieve any specific purpose (such as completion of a reaction between two or more mixing liquids or the disinfection of a liquid) may be easily found by simple experimentation once the principles of the invention are known. Suitably, 2 to 12 static mixer elements may be used within the conduit, but more elements may be needed if the fluid is of very high turbidity or low transmissivity. Mathematical modelling using, for instance, computational fluid dynamics and/or finite element analysis may be used to predict the expected performance of the apparatus and to estimate the number of static mixer elements required in the array.

For instance, with a cylindrical conduit of 12.25 cm internal diameter, and four elongate ultraviolet lamps, it has been found that an array consisting of 12 alternating STM elements is adequate to ensure adequate irradiation for a low viscosity fluid having a transmissivity of, for instance, 50% or less.

With a cylindrical conduit of 49 cm internal diameter, and four elongate ultraviolet cluster sources (each cluster having four UV lamps), it has been found that an array of 3 alternating STM elements is adequate to ensure adequate irradiation for a low viscosity fluid of having a transmissivity of, for instance, 90% or less.

Specific embodiments of the present invention will now be described, by way of example only, with reference to the accompanying drawings in which:

FIG. 3 is a schematic cross-sectional side view of an irradiation apparatus in accordance with another embodiment of the present invention;

FIG. 3A is an end cross sectional view through section B-B of FIG. 3; and

Figure 2:
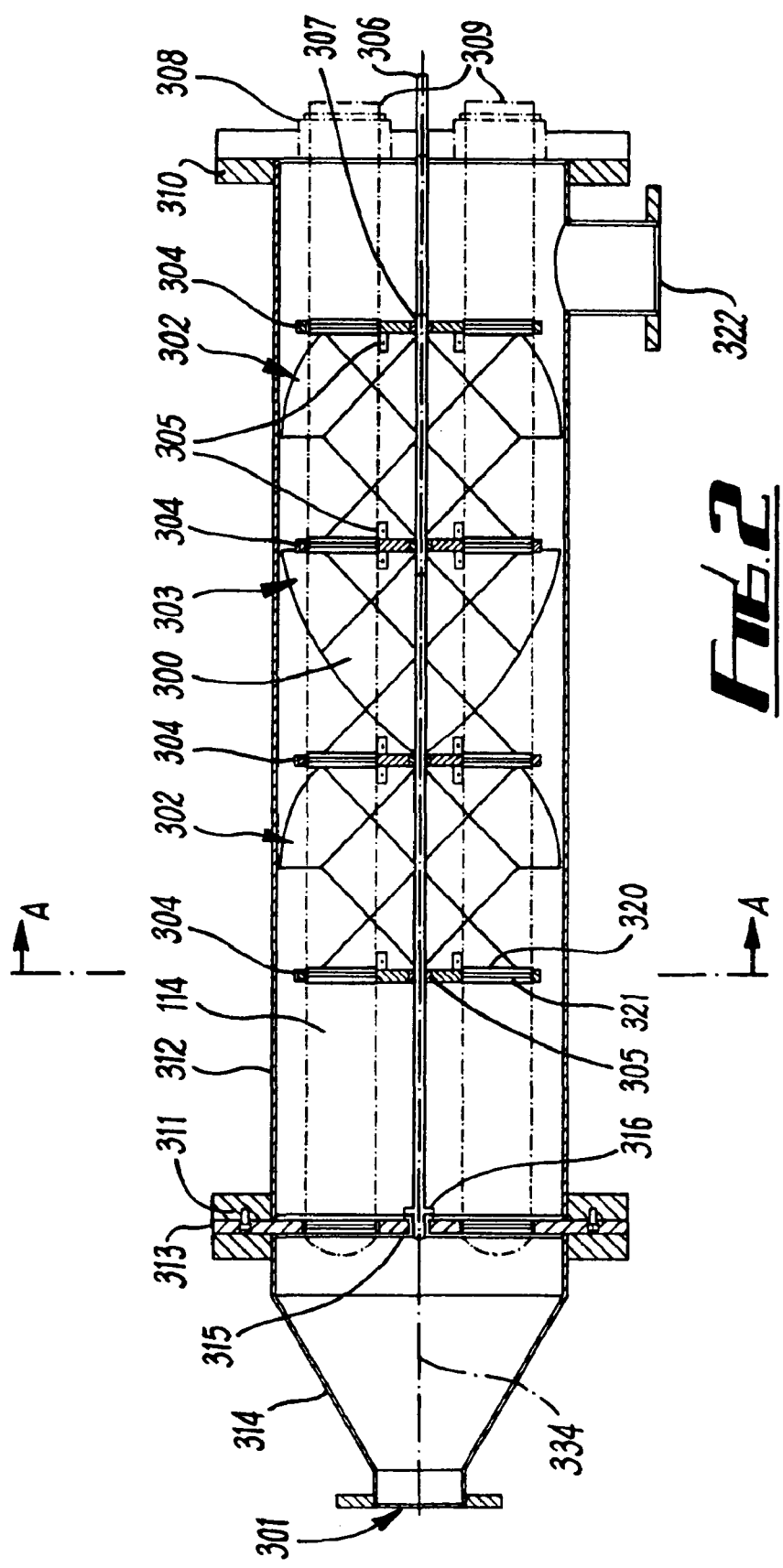
FIG. 2 is a schematic cross-sectional side view of an irradiation apparatus in accordance with an embodiment of the present invention.
Figure 2A:
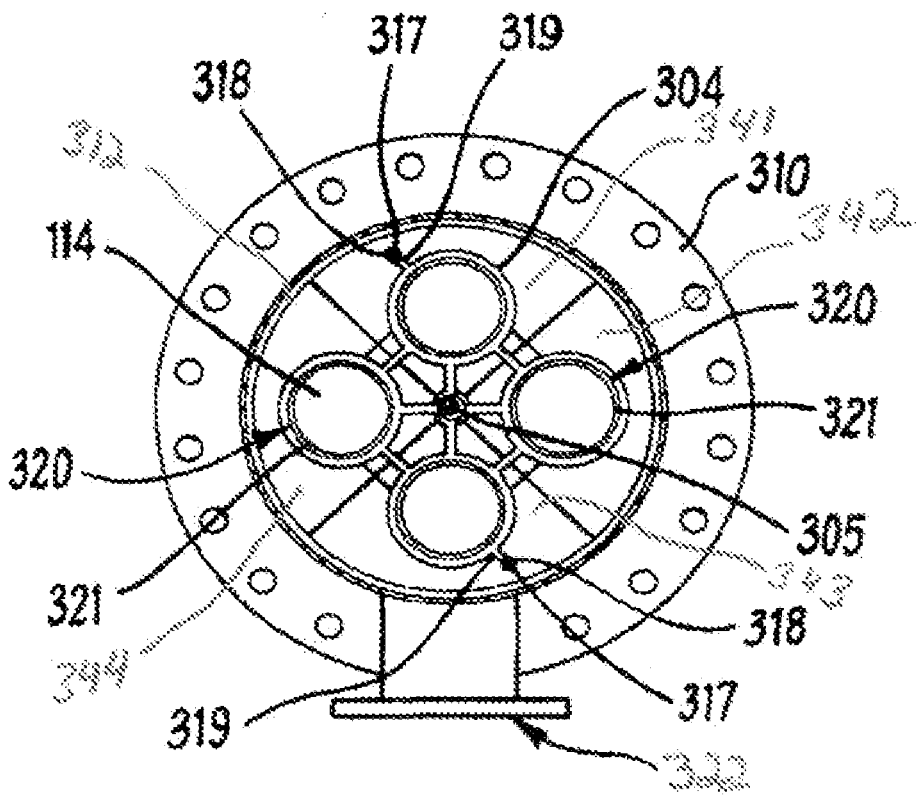
FIG. 2A is an end cross sectional view through section A-A of FIG. 2.

Turning to FIG. 2, a conduit 312 extends longitudinally along a central axis 334. The conduit has an inlet port 301 and an outlet port 302. Four radiation cluster sources 114 (each comprising four UV tubes—not shown in detail) extend along the conduit 312 parallel to the axis 334. The UV radiation cluster sources 114 (suitable cluster sources are available from Jen Act Limited of Whitchurch, UK) extend through apertures in static mixer elements 302, 303. A static mixer array 300 is formed of first static mixer element 302 and second static mixer element 303 extending along the conduit downstream of the inlet port 301 in the order 302, 303, 302.

The static mixer elements 302, 303 are each composed of four deflection surfaces having a quarter circle cross-section. The leading and trailing edges of each deflection surface are thus equal to half of the width of the conduit (e.g. the conduit radius, for a circular conduit section of pipe). The four such deflection surfaces are connected together to form a full static mixer element of circular cross-sectional shape, for fitting into the conduit. These mixer elements are of the STM mixer element type as available from Statiflo International Limited. Three such static mixer elements, arranged longitudinally, are illustrated in FIG. 2. Leading and trailing edges of adjacent elements are perpendicular to each other. Each deflection surface alternates between being formed of left handed and right handed elements.

Between each of the static mixer elements 302, 303 and at each end of the static mixer array, there are wiper support plates 304 which are bolted to the static mixer elements 302, 303 using brackets 305. Each wiper support plate 304 has a tapped central bush 305 through which an actuator rod 306 passes along the central axis of the conduit. A section of the rod is a threaded section 307 arranged to mate with the tapped bushes 305 of the wiper support plates 304. A downstream end plate 308 bolted to a flange 310 at the downstream end of the conduit 312 holds the downstream ands of the radiation sources 114 in place, allowing their ends 309 to project out for connection to a power supply cable.

The conical inlet port assembly 314 holding the inlet port 301 is bolted to a flange 311 at the upstream end of the conduit 312. An upstream end support plate 313 for the radiation sources 114 forms a gasket between the flange 311 and the inlet port assembly 314.

The end support plate 314 is provided with a low friction bush 315 at its centre to hold the end of the actuator rod 306 and to allow it to rotate freely whilst supported in the bush 315. A shoulder 316 at the end of the actuator rod 306 assists the mating of the rod-end with the bush 315. The actuator rod is rotated by a motor (not shown).

Figure 2B:
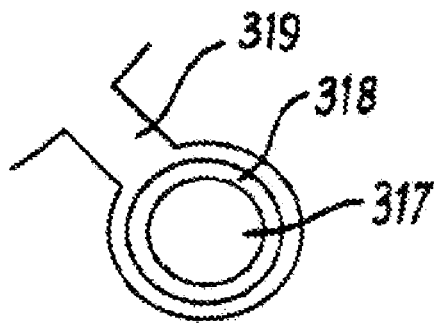
FIG. 2B is a detailed view of the support guides shown in FIG. 2A.

Two support rods 317 (not visible in FIG. 2) run longitudinally between the upstream and downstream end plates 313, 308 end plates and pass through bushed apertures 318 in support guides 319 on the wiper support plates 304 such that the plates can slide along the support rods 317. Details of the support guides are shown in cross section in FIG. 2B.

The radiation sources 114 pass through circular apertures 320 in the wiper support plates 304. Each aperture is provided with a fluorinated rubber wiper seal as a wiper blade 321 around its circumference.

In use, a fluid, for instance a moderately turbid liquid such as waste water enters the inlet port 301 and passes downstream along the interior and past the radiation sources 114 which shine UV radiation into the liquid, for instance for disinfection of the fluid. The mixer elements 302, 303 ensure that the fluid is mixed as it passes through the conduit 312, ensuring even treatment of all the fluid by ultraviolet radiation. The treated fluid passes out of the outlet port 322 for collection or for further treatment.

Cleaning of the ultraviolet radiation sources 114 can be effected without stopping the passage of fluid through the apparatus by rotating the actuator rod 306 in order to cause the threaded section 307 to move the tapped central bushes 305 of the wiper support plates 304 and hence the static mixer array and the wiper blades 321 longitudinally along the surfaces of the ultraviolet radiation sources. By moving the wiper blades 321 back and forth along the surfaces of the ultraviolet radiation sources 114, cleaning of the surfaces is carried out without the need to dismantle the apparatus.

FIG. 3 shows another embodiment of the irradiation apparatus of the invention in schematic cross sectional view. FIG. 3A shows an end cross sectional view through the section B-B of FIG. 3.

To aid clarity, the elongate radiation sources 114 have only been shown schematically in FIG. 3 as they pass through the apertures in the static mixer array 300. The apertures in the static mixer array 300 into which the radiation sources 114 fit are shown in cross section FIG. 3A.

A conduit 312 extends longitudinally along a central axis 334. The conduit has an inlet port 301 and an outlet port 322. Four radiation sources 114 (not shown in FIG. 2) extend along the conduit 312 parallel to the axis 334. The UV radiation sources 300 in this embodiment are individual UV tube sources held in quartz sheaths extending through apertures in a static mixer array 300 and supported by the end plate 308, which is attached to the conduit 312. The static mixer array 300 is formed of first static mixer element 302 and second static mixer element 303 extending along the conduit downstream of the inlet port 301 in the order 302, 303, 302 etc. .

The static mixer elements 302, 303 of the array 300 are each composed of four deflection surfaces having a quarter circle cross-section as explained in detail above. They are of steel and are welded to each other to form the array 300.

The conical inlet port assembly 314 holding the inlet port 301 is bolted to a flange 311 at the upstream end of the conduit 312. A downstream end plate 308 bolted to a flange 310 at the downstream end of the conduit 312 holds the downstream ands of the radiation sources 114 in place, allowing their ends 309 to project out for connection to a power supply cable.

In use, a fluid, for instance a liquid of low transmissivity, such as a milk, enters the inlet port 301 and passes downstream along the interior and flows past the radiation sources 114 which shine UV radiation into the liquid, for instance for disinfection of the milk. The mixer element array 300 ensures that the fluid is mixed as it passes through the conduit 312, ensuring even treatment of the fluid by the ultraviolet radiation and exchange of fluid at surfaces adjacent to the radiation sources 114. The treated fluid passes out of the outlet port 322 for collection or for further treatment.

Cleaning of the surfaces of the ultraviolet radiation sources 114 in contact with the fluid is effected in this embodiment of the invention by dismantling the apparatus and cleaning individual parts. The end plate 308 is detached from the flange 310 and the static mixer array 300 may be withdrawn from the conduit 312 along with the UV radiation sources 114 extending through it. The radiation sources 114 and the static mixer array 300 may then be separated, cleaned and reassembled for further use.

Figure 1:
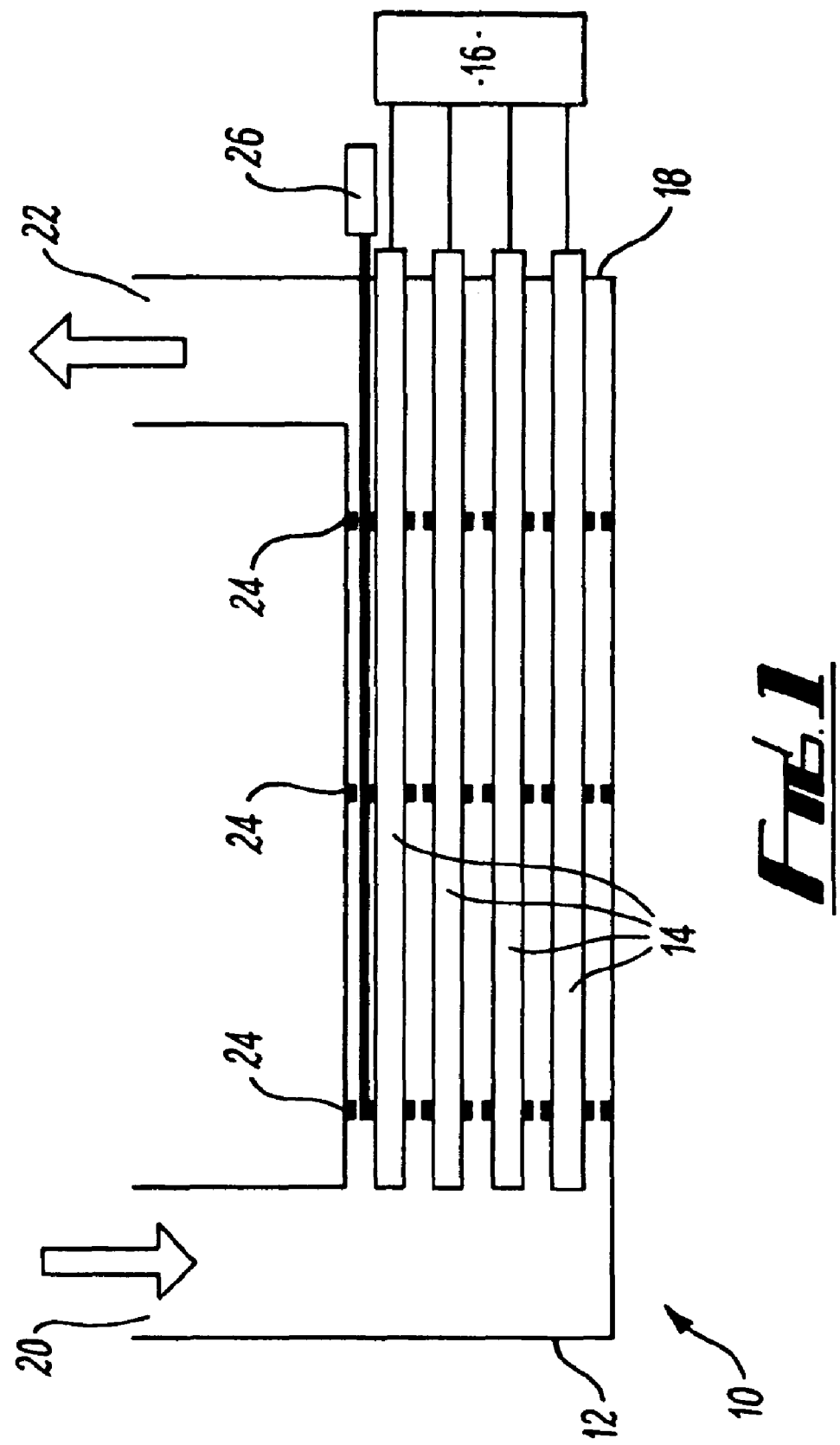
FIG. 1 is a schematic cross-sectional side view of a prior art water purifier and has been described in detail hereinbefore.

For each of the embodiments described in FIG. 1(comparative) and in FIG. 2 (according to the invention), computational modelling has been carried out (using finite element analysis/computational fluid dynamics) to assess the predicted kill rate of Cryptosporidium parva in wastewater having various transmissivities. The same flow rates and the same UV power input for the same reactor volume were used in each case. It was found that the apparatus according to the invention should provide more than double the kill rate compared to the prior art apparatus.

It will be appreciated that the above embodiments are described by way of example only, and that various alternatives will be apparent to the skilled person as falling within the scope of the appended claims. For instance, the outlet port could be arranged to be coaxial with the conduit or for cleaning, the array of static mixer elements could be held in place whilst the radiation sources are moved to provide cleaning.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. An ultraviolet irradiation apparatus comprising:
   a conduit having a central axis and adapted to conduct a fluid through its interior along its length from an inlet port to an outlet port downstream of the inlet port;
   an array of static mixer elements located within the conduit, each static mixer element comprising one or more deflection surfaces adapted to split and rotate said fluid's flow,
      wherein the array of static mixer elements comprises at least one first static mixer element and at least one second static mixer element alternately positioned along the length of the conduit,
      wherein at least one of the first and second static mixer elements substantially extends across the conduit's cross section, whereby undeviated flow of said fluid substantially parallel to the central axis is prevented,
      wherein each first static mixer element comprises four first deflection surfaces substantially symmetrically arranged around the central axis of the conduit,
      wherein each second static mixer element is positioned to split and rotate said fluid flow from an adjacent upstream first static mixer element, and
      wherein each second static mixer element comprises four second deflection surfaces substantially symmetrically arranged around the central axis of the conduit, each arranged to be substantially downstream of a corresponding first deflection surface of the adjacent upstream first static mixer element; and
   at least four elongate ultraviolet radiation sources located within the conduit and mutually spaced from each other and from the conduit's inner wall and substantially symmetrically arranged around the central axis of the conduit, the elongate ultraviolet radiation sources extending through apertures in the deflection surfaces of the static mixer elements, and the elongate ultraviolet radiation sources further being mutually spaced and arranged so that fluid may pass through a region located between each adjacent pair of the four ultraviolet radiation sources,
   wherein the array of static mixer elements and the elongate ultraviolet radiation sources are arranged for relative motion therebetween along longitudinal axes of the ultraviolet radiation sources, whereby the relative motion wipes surfaces of the elongate ultraviolet radiation sources.

2. The apparatus of claim 1, wherein two of the first deflection surfaces on opposite sides of the central axis rotate said fluid's flow in a left-hand direction and the other two rotate said fluid's flow in a right-hand direction.

3. The apparatus of claim 1, wherein the array of static mixer elements comprises a plurality of wipers arranged to wipe the surfaces of the elongate ultraviolet radiation sources.

4. The apparatus of claim 3, wherein the wipers are formed of a flexible resilient material adapted to conform to the surfaces of the elongate ultraviolet radiation sources.

5. The apparatus of claim 3, wherein wipers are positioned between each pair of static mixer elements of the array of static mixer elements.

6. The apparatus of claim 5, wherein wipers are positioned at each end of the array of static mixer elements.

7. The apparatus of claim 1, further comprising:
   an actuator coupled to at least one of the array of static mixer elements and to at least one of the elongate ultraviolet radiation sources, for providing the relative motion therebetween.

8. A method of irradiating a fluid comprising the step steps of:
   flowing the fluid through the apparatus according to claim 1; and
   irradiating the fluid within the conduit with radiation from the elongate ultraviolet radiation sources whilst performing the step of flowing.

9. The method of claim 8, wherein the fluid has a transmissivity of 90% or less.

10. The method of claim 8, wherein the fluid is a liquid.

11. A method of irradiating a fluid with ultraviolet radiation comprising the steps of:
    flowing the fluid through the apparatus according to claim 1, the apparatus having the array of static mixer elements and the elongate ultraviolet radiation sources arranged for the relative motion therebetween; and
    wiping the surfaces of the elongate ultraviolet radiation sources responsive to the relative motion whilst irradiating the fluid within the conduit with radiation from the elongate ultraviolet radiation sources.

* * * * *